US009797251B2

(12) United States Patent
Worthington et al.

(10) Patent No.: US 9,797,251 B2
(45) Date of Patent: Oct. 24, 2017

(54) SYSTEMS AND METHODS FOR CONTROLLING A CONVEYOR IN A MINING SYSTEM

(71) Applicant: Joy MM Delaware, Inc., Wilmington, DE (US)

(72) Inventors: Brian Worthington, Leicestershire (GB); Phil Rees, Worcester (GB); Tim Proctor, Worcester (GB); Gordon Powell, Malvern (GB); Robert Smith, Malvern (GB)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 15/244,870

(22) Filed: Aug. 23, 2016

(65) Prior Publication Data
US 2016/0356159 A1 Dec. 8, 2016

Related U.S. Application Data

(63) Continuation of application No. 13/553,215, filed on Jul. 19, 2012, now Pat. No. 9,422,112.
(Continued)

(51) Int. Cl.
*B65G 23/44* (2006.01)
*E21F 13/00* (2006.01)
(Continued)

(52) U.S. Cl.
CPC .............. *E21F 13/06* (2013.01); *B65G 23/44* (2013.01); *E21F 13/00* (2013.01);
(Continued)

(58) Field of Classification Search
CPC ......... B65G 23/44; E21F 13/00; E21F 13/006
(Continued)

(56) References Cited

U.S. PATENT DOCUMENTS 3,675,482 A   7/1972 Hewitt
3,718,250 A   2/1973 Bosworth et al.
(Continued)

FOREIGN PATENT DOCUMENTS

CN     1661346 A    8/2005
CN   101934920 A    1/2011
(Continued)

OTHER PUBLICATIONS

Second Office Action with English translation from the State Intellectual Property Office of the People's Republic of China dated Feb. 16, 2016 (27 pages).
(Continued)

*Primary Examiner* — Leslie A Nicholson, III
*Assistant Examiner* — Lester Rushin
(74) *Attorney, Agent, or Firm* — Michael Best & Friedrich LLP

(57) ABSTRACT

Systems and methods for controlling a conveyor in a mining system. The conveyor includes a sprocket, a chain, a hydraulic cylinder, one or more sensors, and a controller. In one implementation, the method includes sensing a characteristic associated with the conveyor, generating a signal based on the characteristic, determining a tension associated with the chain based on the signal, determining an amount of chain stretch based on the tension, and modifying a position of the hydraulic cylinder based on the amount of chain stretch.

20 Claims, 16 Drawing Sheets

Related U.S. Application Data

(60) Provisional application No. 61/510,850, filed on Jul. 22, 2011, provisional application No. 61/510,839, filed on Jul. 22, 2011.

(51) Int. Cl.
*E21F 13/06* (2006.01)
*E21C 27/02* (2006.01)

(52) U.S. Cl.
CPC ............... *B65G 2203/0266* (2013.01); *B65G 2203/042* (2013.01); *E21C 27/02* (2013.01)

(58) Field of Classification Search
USPC ... 198/617, 678, 810.04, 810.3, 810.01, 813
See application file for complete search history.

(56) References Cited

U.S. PATENT DOCUMENTS

| | | |
|---|---|---|
| 3,911,764 A | 10/1975 | Duggan |
| 3,926,304 A | 12/1975 | Watabe |
| 3,963,115 A | 6/1976 | Teske et al. |
| 4,284,192 A | 8/1981 | Taylor |
| 4,372,172 A | 2/1983 | Gombocz et al. |
| 4,533,856 A | 8/1985 | Malone |
| 4,657,131 A | 4/1987 | Brychta et al. |
| 5,119,893 A | 6/1992 | Jost |
| 5,131,528 A | 7/1992 | Bandy, Jr. |
| 5,482,154 A | 1/1996 | Affeldt et al. |
| 5,505,293 A | 4/1996 | Ochs et al. |
| 5,624,162 A | 4/1997 | Guse et al. |
| 5,632,372 A | 5/1997 | Steinbuchel, IV et al. |
| 5,641,058 A | 6/1997 | Merten et al. |
| 5,647,640 A | 7/1997 | Heintzmann et al. |
| 5,736,652 A | 4/1998 | Strubbe |
| 5,895,332 A | 4/1999 | Olson et al. |
| 5,997,423 A | 12/1999 | Kwon |
| 6,131,727 A | 10/2000 | Nelson |
| 6,302,261 B1 | 10/2001 | Gilberti et al. |
| 6,545,231 B1 | 4/2003 | Hafner |
| 6,715,601 B2 | 4/2004 | Abel et al. |
| 6,925,890 B2 | 8/2005 | Fontenot |
| 7,117,989 B2 | 10/2006 | Weigel et al. |
| 7,540,374 B2 | 6/2009 | Rathbun et al. |
| 7,600,822 B2 | 10/2009 | Klabisch et al. |
| 7,793,775 B2 | 9/2010 | Rozenfeld et al. |
| 8,202,411 B2 | 6/2012 | Buschmann |
| 8,550,236 B2 | 10/2013 | Merten et al. |
| 2004/0124067 A1 | 7/2004 | Fernandez Mostaza |
| 2005/0000367 A1 | 1/2005 | Meade |
| 2005/0056527 A1 | 3/2005 | Weigel et al. |
| 2008/0289935 A1 | 11/2008 | Hesketh |
| 2010/0270128 A1 | 10/2010 | Hill |
| 2010/0270130 A1 | 10/2010 | Tout |
| 2010/0270131 A1 | 10/2010 | Vasey |
| 2011/0024268 A1 | 2/2011 | Merten et al. |
| 2012/0118707 A1 | 5/2012 | Tout et al. |

FOREIGN PATENT DOCUMENTS

| | | |
|---|---|---|
| CN | 101934925 A | 1/2011 |
| CN | 101948045 A | 1/2011 |
| CN | 202828755 U | 3/2013 |
| DE | 2017949 A1 | 10/1971 |
| DE | 3927892 A1 | 2/1991 |
| EP | 1310700 A2 | 5/2003 |
| GB | 2095721 A | 10/1982 |
| GB | 2346663 A | 8/2000 |
| JP | 2005298173 A | 10/2005 |
| RU | 2304077 C2 | 8/2007 |
| SU | 385854 A1 | 6/1973 |
| WO | 2010028783 A2 | 3/2010 |

OTHER PUBLICATIONS

1st Office Action from the State Intellectual Property Office of the People's Republic of China for Application No. 201210257081.4 dated Jul. 15, 2015 (22 pages).

United Kingdom Intellectual Property Office Search Report for Application No. GB0907258.8 dated Apr. 8, 2010 (2 pages).

Examination Report from the United Kingdom Intellectual Property Office for Application No. GB1212899.7 dated Nov. 29, 2016 (5 pages).

SYSTEMS AND METHODS FOR CONTROLLING A CONVEYOR IN A MINING SYSTEM

RELATED APPLICATIONS

This application is a continuation of U.S. patent application Ser. No. 13/553,215, filed Jul. 19, 2012, now U.S. Pat. No. 9,422,112, the entire contents of which is hereby incorporated by reference. This application also claims the benefits, through U.S. patent application Ser. No. 13/553,215, filed Jul. 19, 2012, now U.S. Pat. No. 9,422,112, of prior-filed U.S. Provisional Patent Application No. 61/510,850, filed Jul. 22, 2011; and Application No. 61/510,839, filed Jul. 22, 2011, the entire contents of both of which are also hereby incorporated by reference.

FIELD

This invention relates to the control of a conveyor, such as an armored face conveyor ("AFC"), or a beam stage loader ("BSL").

SUMMARY

Longwall mining systems include, among other things, an AFC or BSL to transport a mined material (e.g., coal) from an area where the material is being mined to an area for processing (e.g., crushing, storage, etc.) AFCs include, for example, a first sprocket and a second sprocket around which a chain is provided. The chain is driven by one or more motors (e.g., a maingate motor, a tailgate motor, etc.), and the movement of the chain around the sprockets causes a conveyor to transport the mined material.

Conventional AFCs that include an extendable return end frame use pre-tensioning techniques to increase chain tension around the sprockets and avoid a slack chain or zero tension condition. The pre-tensioning techniques include, for example, using a hydraulic cylinder to push the first sprocket away from the second sprocket. Packets or spacers are then manually inserted near the sprocket to maintain the high pre-tension in the chain.

Pre-tensioning the chain as described above has a variety of drawbacks. For example, achieving and maintaining high pre-tension on the chain (e.g., 30-40 tons) increases the strain and wear of the chain, the sprockets, etc. Additionally, as the mined material is loaded onto the AFC, the tension of the chain further increases. As such, a chain that is already experiencing strain as a result of the high pre-tensioning experiences further increased strain as the mined material is loaded onto the conveyor.

Accordingly, the invention may generally provide, among other things, systems and methods for controlling an AFC to automatically control chain tension by altering a sprocket position with a hydraulic cylinder. The invention may be used in conjunction with, for example, an AFC in which a first end of the AFC is fixed and a second end of the AFC is extendable. For such AFCs, the tension in the chain varies along the length of the conveyor, and zero tension or slack chain conditions should be avoided in order to maximize the reliability of the AFC. As such, one construction of the system includes an AFC having an extendable return end frame, a first sprocket, a second sprocket, one or more hydraulic cylinders, one or more chains, and a controller. At least one of the first sprocket and the second sprocket include a drive mechanism (e.g., a motor and a motor controller). The drive mechanism turns the associated first sprocket and second sprocket to transport a mined material from a first location to a second location, and the controller uses a measured electrical characteristic associated with the AFC to automatically control the position of the one or more hydraulic cylinders or sprockets.

For example, the controller utilizes a stored relationship between an electrical characteristic of the one or more motors and a position of the one or more hydraulic cylinders, a position of the first or second sprocket, a tension of the one or more chains, an amount of mined material loaded on the conveyor, etc. Based on the electrical characteristic, the one or more hydraulic cylinders are controlled to increase or decrease a distance between the first sprocket and the second sprocket to account for the stretching of the one or more chains that occurs when the mined material is loaded on the conveyor. Although pre-tensioning is still used, the amount of pre-tensioning required can be reduced from approximately 30-40 tons to approximately fewer than 10 tons (e.g., 5-6 tons) by dynamically modifying the position of, for example, the one or more hydraulic cylinders based on the electrical characteristic. The reduction in the required amount of pre-tensioning reduces the amount of strain and wear on the components of the system. In another construction, the controller receives a direct measurement of the tension of the one or more chains from a chain tension sensor. Based on the measured chain tension, the one or more hydraulic cylinders are controlled to increase or decrease the distance between the first sprocket and the second sprocket to account for the stretching of the one or more chains.

In one implementation, the invention may provide a method of controlling a position of a hydraulic cylinder in an armored face conveyor. The armored face conveyor includes a sprocket, a chain, the hydraulic cylinder, and a controller. The method may generally include sensing an electrical characteristic associated with the armored face conveyor, determining a torque associated with the sprocket based on the electrical characteristic, determining a tension associated with the chain based on the torque, determining an amount of chain stretch based on the tension, and modifying the position of the hydraulic cylinder based on the determined amount of chain stretch.

In another implementation, the invention may provide a method of controlling a position of a hydraulic cylinder in an armored face conveyor. The armored face conveyor includes a sprocket, a chain, a chain tension sensor, the hydraulic cylinder, and a controller. The method includes measuring or sensing a chain tension using the chain tension sensor, generating a signal related to the sensed chain tension, conditioning the signal related to the sensed chain tension, determining an amount of chain stretch based on the conditioned signal, and modifying the position of the hydraulic cylinder based on the determined amount of chain stretch.

In one embodiment, the invention provides a conveyor for a mining system. The conveyor includes a frame, a first sprocket having a first position, a second sprocket having a second position, a chain associated with the first sprocket and the second sprocket, a sensor configured to generate a signal related to an electrical characteristic of the conveyor, a drive mechanism coupled to at least one of the first sprocket and the second sprocket, a hydraulic cylinder, and a controller. The frame has a fixed first end and an extendable second end. The first position is separated by a distance from the second position. The drive mechanism is configured to drive the at least one of the first sprocket and the second sprocket. The controller is configured to receive the signal from the sensor, determine an amount of chain stretch in the chain based on the received signal, determine a hydraulic cylinder position based on the determined amount of chain stretch, and generate a control signal for controlling the hydraulic cylinder to the hydraulic cylinder position.

In another embodiment, the invention provides a method of controlling a chain tension for a conveyor in a mining system. The method includes analyzing a signal associated with the chain tension, determining the chain tension based on the analyzed signal, determining a chain extension based on the determined chain tension, determining a position for a hydraulic cylinder based on the determined chain extension, and controlling the hydraulic cylinder to the position.

In another embodiment, the invention provides a mining system that includes a conveyor, a first sensor, a second sensor, a hydraulic cylinder, and a controller. The first sensor is for sensing a chain tension and is configured to generate a first signal indicative of the chain tension. The second sensor is for sensing an electrical characteristic of the conveyor and is configured to generate a second signal indicative of the chain tension based on the electrical characteristic of the conveyor. The controller is configured to receive the first signal from the first sensor, receive the second signal from the second sensor, determine a chain tension based on one of the first signal and the second signal, and control a position of the hydraulic cylinder based on the determined chain tension.

Independent aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Implementations and constructions of the invention described herein relate to a longwall chain conveyor system and the control thereof. The longwall chain conveyor system includes, for example, armored face conveyors ("AFCs") or beam stage loaders ("BSLs"). For descriptive purposes, the invention is described herein with respect to embodiments that include AFCs. AFCs include, for example, a return end frame, a first sprocket, a second sprocket, one or more chains, one or more motors, one or more hydraulic cylinders, a controller, and a user interface. The controller is configured to receive one or more signals related to an electrical characteristic of the AFC and automatically control the position of the first sprocket or second sprocket based on the electrical characteristic. The electrical characteristic is, for example, a voltage, a current, a power factor, motor speed, motor torque, input power, output power, etc. In some implementations, the electrical characteristic is associated with the one or more motors (e.g., a tailgate motor or a maingate motor) which are used to turn the first and second sprocket. Additionally or alternatively, the controller is configured to receive one or more chain tension signals related to a sensed chain tension and automatically control the position of the first sprocket or second sprocket based on the chain tension signals. Based on the electrical characteristic or the chain tension signals, the controller determines a desired return end frame extension, a desired position for the one or more hydraulic cylinders, a desired position for the first sprocket, a desired position for the second sprocket, an amount of mined material loaded on the AFC, one or more tensions associated with the one or more chains, one or more desired tensions associated with the one or more chains, a shearer position, etc. For example, after the controller has determined a desired position for the one or more hydraulic cylinders, the controller controls the one or more hydraulic cylinders to the desired position to reposition the first sprocket. In some implementations, the determination of the position for the one or more hydraulic cylinders is based on a relationship between the electrical characteristic and sprocket torque, chain tension, the amount of mined material loaded on the conveyor, etc.

Figure 1:
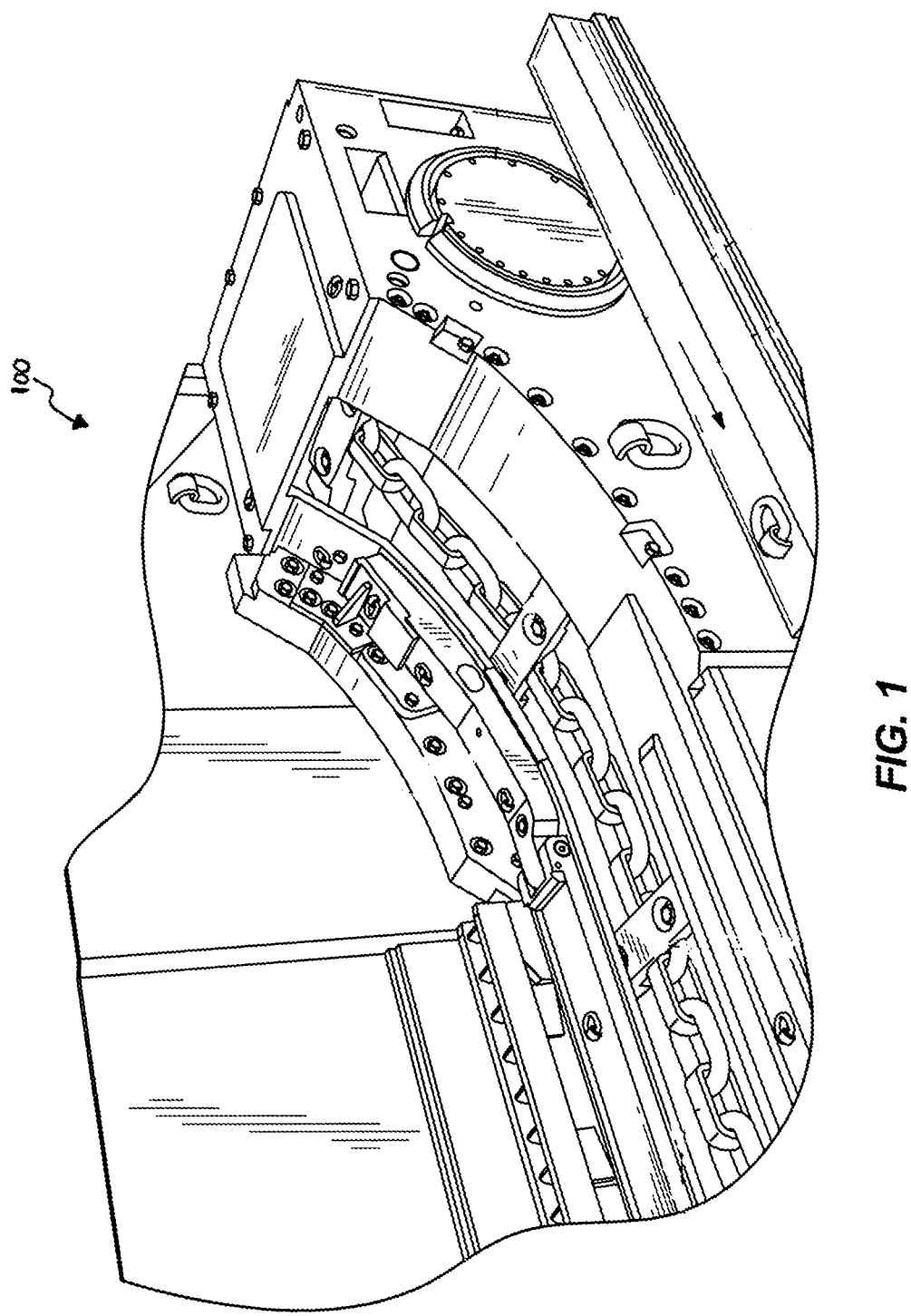
FIG. 1 illustrates an end frame of a chain conveyor.

FIG. 1 illustrates a return end frame 100 that includes, among other things, a fixed frame portion, an extendable frame portion, and one or more hydraulic cylinders. The return end frame 100 is a part of a Longwall mining system that also includes, for example, a shearer. In some constructions, the position of the extendable frame portion is determined using a linear displacement sensor configured to measure the position of the extendable frame portion through its full range-of-motion. The position of the extendable frame portion may be modified (e.g., incremented or decremented) to correspondingly control the position of the one or more hydraulic cylinders, the first sprocket, the second sprocket, etc.

Figure 2:
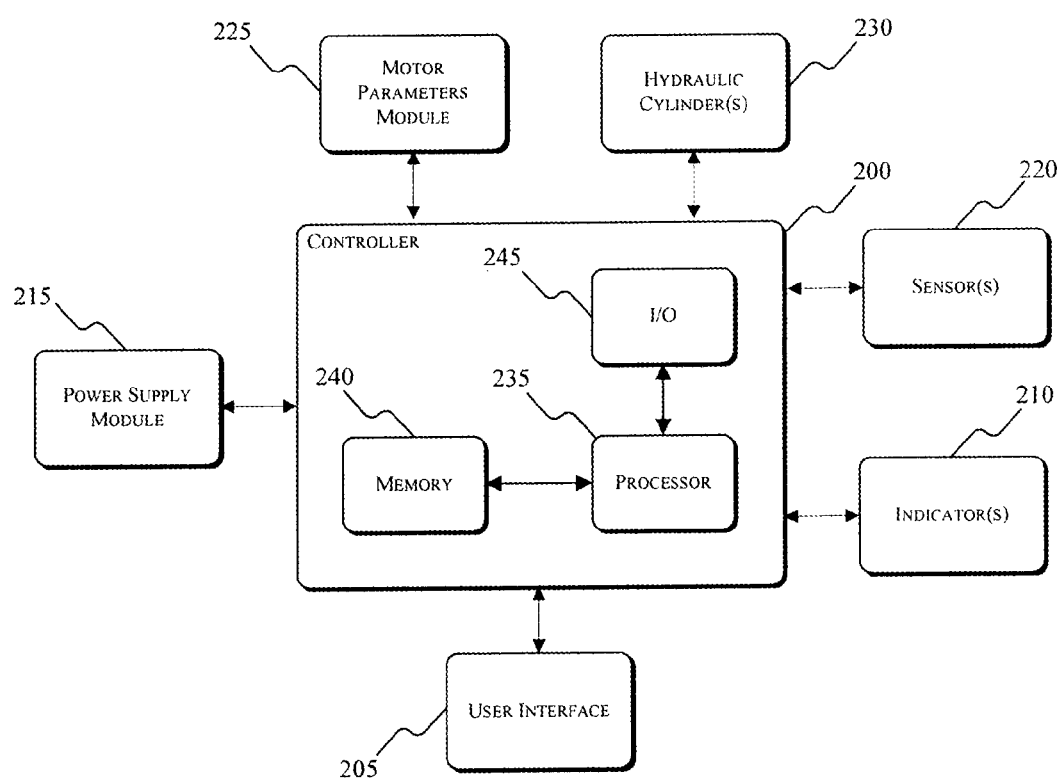
FIG. 2 illustrates a controller for an AFC according to a construction of the invention.

FIG. 2 illustrates a controller 200 associated with the return end frame 100. The controller 200 is connected or coupled to a variety of additional modules or components, such as a user interface module 205, one or more indicators 210, a power supply module 215, one or more sensors 220, a motor parameters module 225, and the one or more hydraulic cylinders 230. The one or more sensors 220 are, for example, power transducers within the AFC configured to measure or sense an electrical characteristic (e.g., current, voltage, power factor, torque, speed, input power, output power, etc.), chain tension sensors configured to directly measure or sense chain tension, etc. The use of transducers that are, in many instances, included in the AFC reduces or eliminates the need for specialty transducers. In some constructions, power transducers and chain tension sensors are both used (e.g., one functions as a redundant system for the other). Additionally, the power transducers are positioned away from hostile areas that may lead to damage or constant replacement of the transducers. The controller 200 includes combinations of software and hardware that are operable to, among other things, control the operation of the AFC, control the position of the return end frame 100, activate the one or more indicators 210 (e.g., LEDs or a liquid crystal display ("LCD")), etc. The controller 200 includes, among other things, a processing unit 235 (e.g., a microprocessor, a microcontroller, or another suitable programmable device), a memory 240, and a bus. The bus connects various components of the controller 200, including the memory 240, to the processing unit 235. In some constructions, the controller 200 is also connected to a communications module that is configured to communicate over one or more networks.

The memory 240 includes, for example, a read-only memory ("ROM"), a random access memory ("RAM"), an electrically erasable programmable read-only memory ("EEPROM"), a flash memory, a hard disk, an SD card, or another suitable magnetic, optical, physical, or electronic memory device. The processing unit 235 is connected to the memory 240 and executes software that is capable of being stored in the RAM (e.g., during execution), the ROM (e.g., on a generally permanent basis), or another non-transitory computer readable medium such as another memory or a disc. Additionally or alternatively, the memory 240 is included in the processing unit 235. The controller 200 also includes an input/output ("I/O") system 245 that includes routines for transferring information between components within the controller 200 and other components of the AFC. Software included in the implementation of the AFC is stored in the memory 240 of the controller 200. The software includes, for example, firmware, one or more applications, program data, one or more program modules, and other executable instructions. The controller 200 is configured to retrieve from memory and execute, among other things, instructions related to the control processes and methods described herein. In other constructions, the controller 200 includes additional, fewer, or different components. The power supply module 215 supplies a nominal AC or DC voltage to the AFC and the components and modules within the AFC. For example, the power supply module 215 is powered by an approved mine power supply.

The motor parameters module 225 is connected to or associated with one or more motors or drive mechanisms that are coupled to the first sprocket and/or the second sprocket. The motor parameters module 225 is connected to or included in, for example, one or more switchgears. The motor parameters module 225 is configured to receive signals associated with one or more parameters (e.g., current, voltage, power factor, torque, speed, input power, output power, etc.) of one or more motors. In some embodiments, the motor parameters module 225 receives signals related to the motor parameters. In other embodiments, the motor parameters module 225 includes or is connected to the one or more sensors 220 for sensing the motor parameters. The motors are controlled by control signals received from the controller 200 or another associated controller, such as a switchgear. The one or more motors are also coupled to gear reduction boxes to reduce the rotational speed of the motor to a rotational speed appropriate for the sprockets and conveyor. In some implementations, the controller 200 is configured to control the motors and the AFC autonomously using a plurality of sensors and one or more stored programs or modules. In other implementations, the controller 200 is configured to control the motors and the AFC based on a combination of manual inputs and automatic controls. The one or more hydraulic cylinders 230 also receive control signals from the controller 200, and selectively extend the return end frame (e.g., change the position of the one or more hydraulic cylinders, the first sprocket, the second sprocket, etc.) based on the control signals from the controller 200. The controller 200 also monitors the one or more motors and the one or more hydraulic cylinders 230 to determine related characteristics. For example, the controller 200 can monitor or sense electrical characteristics of the one or more motors, the position of the one or more hydraulic cylinders 230 (e.g., an extension of the one or more hydraulic cylinders), etc. Although a single controller is illustrated, in other constructions, the controller 200 may be separated into a plurality of controllers. For example, the controller 200 may be separated into a consolidated control unit ("CCU"), a programmable control unit ("PCU"), one or more switchgears, etc. The CCU can be housed in an explosion-proof enclosure and provides control over the longwall conveyor system. The PCU is an intrinsically safe system that can be interfaced with the CCU for, among other things, stopping, inhibiting, tripping, etc., the operation of the conveyor. The one or more switchgears are configured to control the starting and stopping of the conveyor, provide protection to the one or more motors, sense or monitor one or more parameters (e.g., electrical parameters) of the one or more motors, etc. Signals from the one or more switchgears and associated with the one or more motor parameters can then be provided to, for example, the CCU, the controller 200, the motor parameters module 225, etc.

The user interface module 205 is used to control or monitor the AFC or the Longwall mining system. For example, the user interface module 205 is operably coupled to the controller 200 to control the speed of the conveyor, the speed of the one or more motors, etc. The user interface module 205 can include a combination of digital and analog input or output devices required to achieve a desired level of control and monitoring for the AFC. For example, the user interface module 205 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMO-LED") display. The user interface module 205 can also be configured to display conditions or data associated with the AFC in real-time or substantially real-time. For example, the user interface module 205 is configured to display measured electrical characteristics of the AFC, the status of the AFC, chain tensions, fault conditions (e.g., slack chain, zero tension chain, etc.), an amount of mined material on the conveyor, etc. In some implementations, the user interface module 205 is controlled in conjunction with the one or more indicators 210 (e.g., LEDs) to provide visual indications of the status or conditions of the AFC.

In some embodiments, the information and data associated with the operation of the AFC is sent, transferred, or transmitted to a remote or mobile device for remote monitoring, remote control, data logging, etc. The remote or mobile device is, for example, a personal computer, a laptop computer, a mobile phone, a tablet computer, a personal digital assistant ("PDA"), an e-reader, a server, a database, etc. In some implementations, the data is transferred via a wireless local area network ("LAN"), a neighborhood area network ("NAN"), a home area network ("HAN"), or a personal area network ("PAN") using any of a variety of communications protocols, such as Wi-Fi, Bluetooth, ZigBee, etc. Additionally or alternatively, the data is transferred to the remote or mobile device over a wide area network ("WAN") (e.g., a TCP/IP based network, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a Digital Enhanced Cordless Telecommunications ("DECT") network, a Digital AMPS ("IS-136/TDMA") network, an Integrated Digital Enhanced Network ("iDEN") network, a Digital Advanced Mobile Phone System ("D-AMPS") network, etc.).

The remote or mobile device includes, for example, a separate controller, a user interface module, a display, a power supply module, and a communications module which operates in a similar manner to corresponding components of the AFC described above. The remote or mobile device also includes, for example, combinations of software and hardware that are operable to, among other things, control the operation of the AFC, control the information that is presented on the display, etc. The information received from the AFC can be received through the communications module which includes one or more antennas, one or more network interface cards ("NICs"), etc., for communicating over one or more of the networks described above.

As previously indicated, in some implementations, the controller 200 is configured to prevent a zero tension or slack chain condition in the one or more chains by using an electrical characteristic associated with the AFC to automatically control the position of the one or more hydraulic cylinders. The controller 200 is also configured to receive signals from the one or more sensors 220 associated with the one or more motors, the one or more hydraulic cylinders 230, one or more chains, or other components of the AFC. The signals from the sensors 220 are related to, for example, tensions of one or more chains or the voltage, the current, the power factor, the motor speed, the motor torque, the input power, the output power, etc., of the one or more motors. The controller 200 then processes and analyzes the signals to determine a desired hydraulic cylinder position that is based on an amount of chain stretch. The amount of chain stretch is dependent upon, among other things, an amount of mined material loaded on the conveyor. In some implementations, the total electrical power of the AFC is used to control the position of the hydraulic cylinder. In other implementations, the power of one of the one or more motors (e.g., a maingate motor or a tailgate motor) is used to control the position of the hydraulic cylinder.

In some implementations, the controller 200 controls the position of the hydraulic cylinder based on one or more relationships between the electrical characteristic (e.g., power) of the AFC and a position of the one or more hydraulic cylinders 230, a position of the first or second sprocket, a tension of the one or more chains, an amount of mined material loaded on the conveyor, a shearer position, etc. Depending on the electrical characteristic, the one or more hydraulic cylinders 230 are controlled to increase or decrease the distance between the first sprocket and the second sprocket to account for the stretching of the one or more chains that occurs when the mined material is loaded on the conveyor. By automatically controlling the position of the hydraulic cylinder based on the electrical characteristic during operation of the AFC, the amount of pre-tensioning required can be significantly reduced, which reduces the amount of strain and wear on the one or more chains, the sprockets, etc. In other implementations, the controller 200 controls the position of the hydraulic cylinder in a similar manner based on the sensed tensions of one or more chains. Additionally, automatically controlling the position of the hydraulic cylinder, as described, allows the controller 200 to implement a variety of mechanisms for improving operation of the AFC. For example, the controller 200 can shut down the AFC in the event of a loss of chain tension, loss of hydraulic pressure, unplanned change in the position of the hydraulic cylinder, when the position of the hydraulic cylinder is supposed to have been modified but no modification was detected, etc.

In some implementations, both the chain tension and the electrical characteristic are sensed. For example, the chain tension is directly measured with a first or chain tension sensor, and the electrical characteristic is measured with a second sensor, such as a power transducer. In such an implementation, a first signal generated by the first sensor and a second signal generated by the second sensor are both received by the controller 200, and one signal is a back-up of the other signal. For example, when the first signal is not received, the controller 200 uses the second signal to determine chain tension. Alternatively, when the second signal is not received, the controller 200 uses the first signal to determine chain tension. In some implementations, the first signal and the second signal can be compared to one another to determine whether one of the first sensor or second sensor is in a fault condition. During a fault condition, the controller 200 may not receive a signal from one (or both) of the first sensor and the second sensor. For example, if the first sensor is the primary sensor, but the controller 200 does not receive a signal from the first sensor (or the signal is corrupt), the controller uses the signal from the second sensor to determine chain tension. Alternatively, if the second sensor is the primary sensor, but the controller 200 does not receive a signal from the second sensor (or the signal is corrupt), the controller 200 uses the signal from the first sensor to determine chain tension. In some implementations, both the first and the second signals are used to determine chain tension.

FIGS. 3-7 illustrate various relationships associated with the operation of the AFC or a Longwall mining system based on test data. Although one or more of the diagrams associated with FIGS. 4-7 may be combined into a single diagram, the diagrams are shown separately for illustrative purposes. As such, one or more of the diagrams may illustrate a relationship between, for example, mined material loaded on a conveyor and the position of a hydraulic cylinder, but may be shown with respect to another characteristic of a Longwall mining system (e.g., shearer position). Such relationships are illustrative of the various correspondences among and dependencies of the described characteristics of Longwall mining systems. Additionally, each of the diagrams is illustrated with time (i.e., minutes) along an x-axis of a coordinate system. By uniformly illustrating time among the diagrams, the relationships between the characteristics and components of the Longwall mining system may be more easily distinguished.

Figure 3:
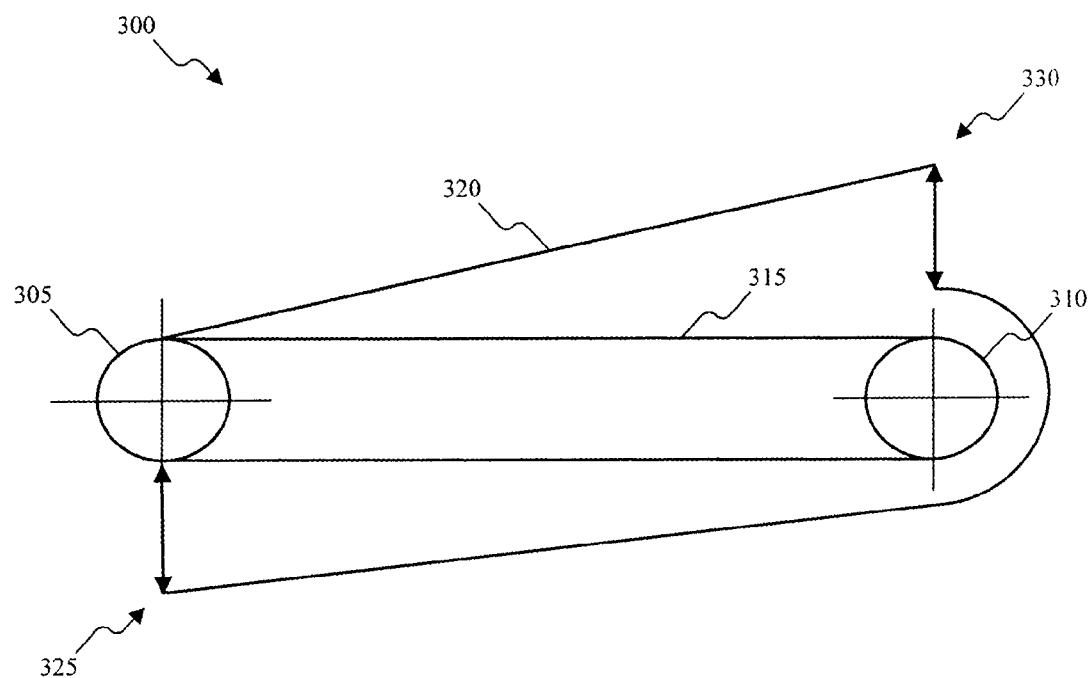
FIG. 3 is a diagram illustrating a manner in which chain tension varies along the length of an AFC.

FIG. 3 illustrates a conveyor 300 that includes a first sprocket 305 (e.g., a return end tailgate sprocket) and a second sprocket 310 (e.g., a delivery end maingate sprocket). The first and second sprockets 305 and 310 are spaced apart from one another and connected by a chain 315 that is wrapped around both the first sprocket 305 and the second sprocket 310. The tension of the chain 315 is represented by the line 320. The further the line 320 is from the chain 315, the greater the tension in the chain 315. As shown in FIG. 3, the tension varies throughout the length of the chain 315 and is the greatest at the bottom portion 325 of the first sprocket 305 (i.e., the tailgate sprocket) and the top portion 330 of the second sprocket 310 (i.e., the maingate sprocket). The tensions associated with conveyor 300 are further described and illustrated graphically below with respect to FIG. 6.

Figure 4:
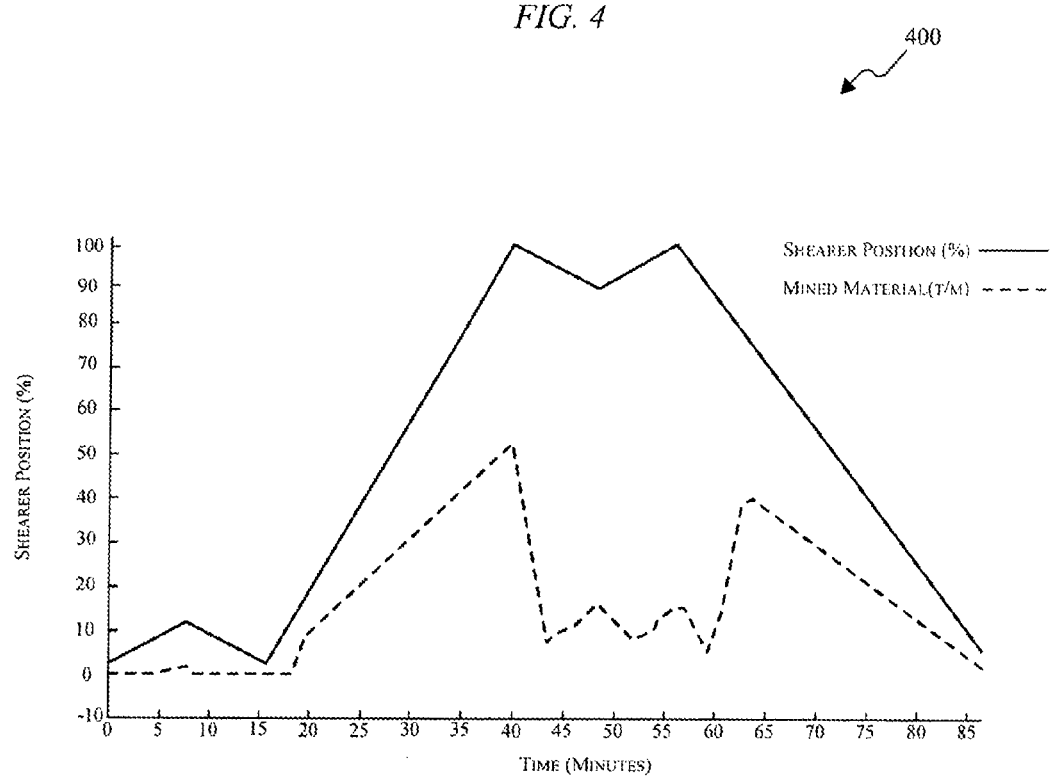
FIG. 4 is a diagram illustrating a relationship between shearer position and an amount of mined material loaded on an AFC.

FIG. 4 is a diagram 400 that illustrates a relationship between shearer position (i.e., a shearer of a Longwall mining system) and the amount of mined material loaded on the AFC (i.e., in tons per meter ["t/m"]). The shearer position is depicted with respect to a percentage (%) of the wall surface. For example, if the shearer is located at an extreme far end of a Longwall mining system, the percentage of the shearer's position is 100% (i.e., with respect to the full range of motion of the shearer along the wall face). As the shearer position increases, the amount of mined material that is loaded on the AFC also increases in relation to the shearer position.

Figure 5:
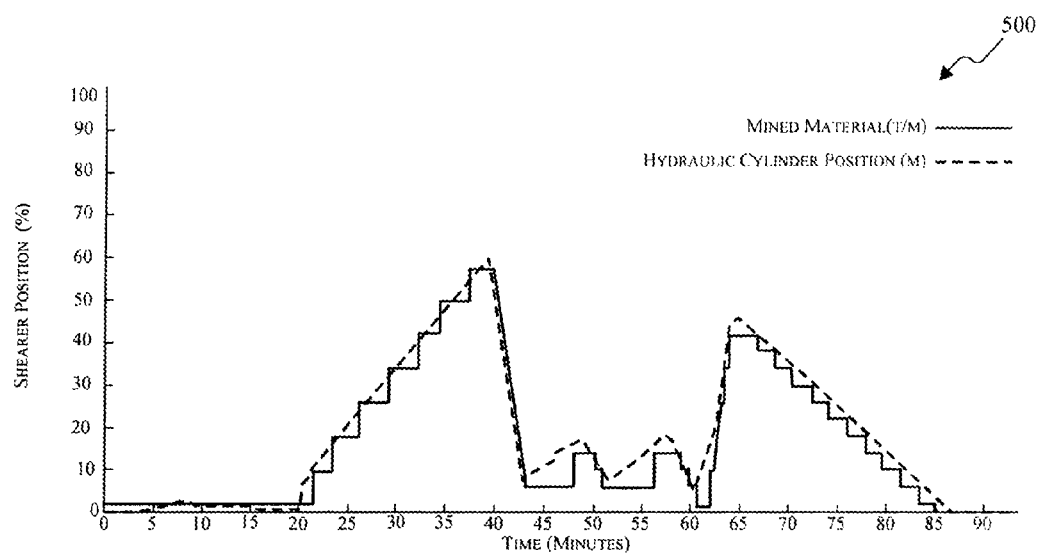
FIG. 5 is a diagram illustrating a relationship between the amount mined material loaded on an AFC and the position of a hydraulic cylinder.

FIG. 5 is a diagram 500 of a relationship between the amount of mined material loaded on the conveyor 300 (i.e., in t/m) and the position of the hydraulic cylinder (i.e., in meters ["m"]). The relationship illustrated in diagram 500 is illustrated with respect to the shearer position previously illustrated and described with respect to FIG. 4. As the shearer position increases, the amount of mined material loaded on the conveyor 300 correspondingly increases. The increased amount of mined material increases the amount of stretch in the chain 315. As the chain is stretched, the sprocket must be pushed out to take in the slack caused by the stretching of the chain and to ensure proper operation and reliability of the AFC.

Figure 6:
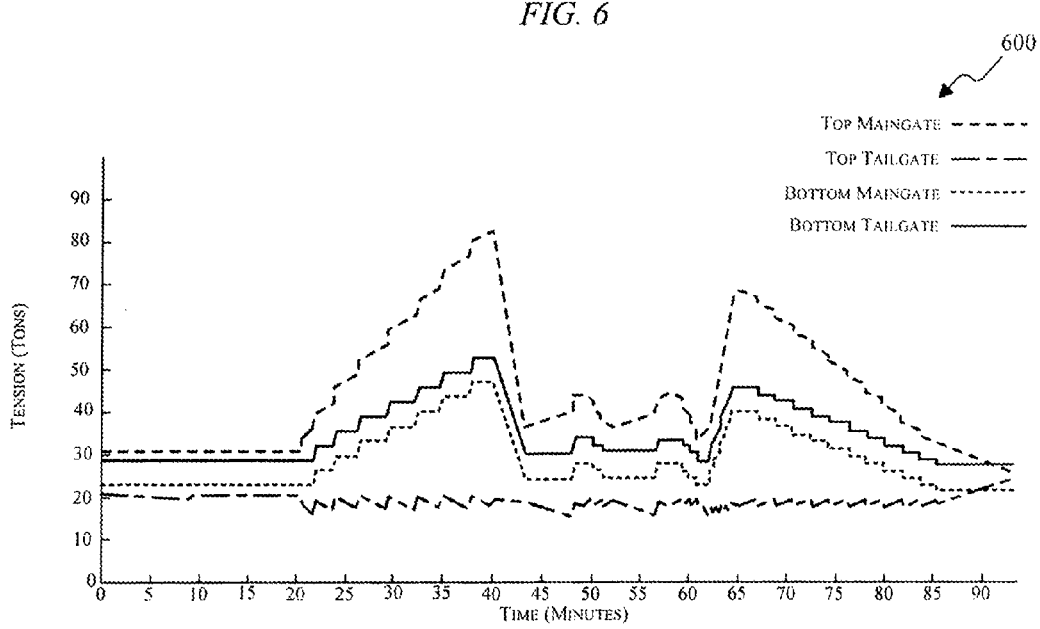
FIG. 6 is a diagram illustrating variations in chain tension with respect to different locations on a chain.

FIG. 6 is a diagram 600 of the tensions (i.e., in tons) at various locations of the chain 315. For example, the diagram 600 includes the top maingate tension, the top tailgate tension, the bottom maingate tension, and the bottom tailgate tension. The tensions are given in tons and are also related to the position of the shearer, the amount of mined material loaded on the conveyor 300, and the position of the hydraulic cylinder by comparison to previous FIGS. 4 and 5. With comparison to FIGS. 4 and 5, as the amount of mined material loaded on the conveyor 300 increases, the tension in the chain 315 increases. Similarly, as the position of the shearer increases, the tension in the chain increases. Also, as the tension increases, the hydraulic cylinder is pushed out to take in the slack associated with the stretching of the chain 315.

Figure 7:
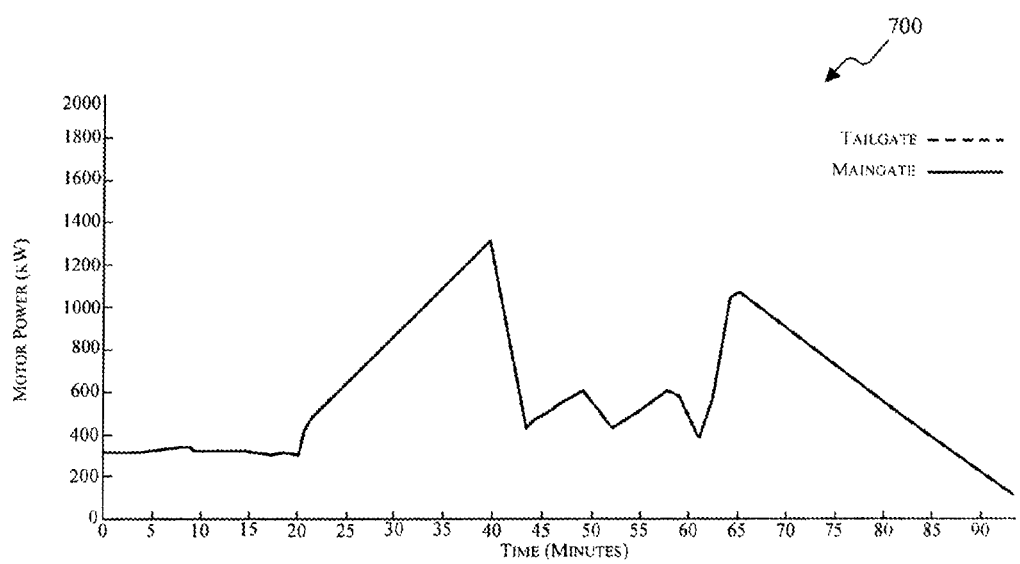
FIG. 7 is a diagram illustrating the motor power associated with a maingate motor and a tailgate motor of an AFC.

FIG. 7 is a diagram 700 of the motor power (i.e., in kilowatts ["kW"]) for each of the one or more motors (e.g., tailgate motor associated with a first sprocket 305 and a maingate motor associated with a second sprocket 310). Due to the precision of the power sharing between the two motors, the differences between the powers used by each motor is virtually indistinguishable. With continued reference to diagrams 400, 500, and 600 above, the power of the maingate and tailgate motors is related to the shearer position, the chain tension, the amount of mined material loaded on the conveyor 300, and the position of the hydraulic cylinder. As such, the controller 200 is able to use these relationships to control the operation of the AFC based on motor power, another electrical characteristic of the AFC, a sensed chain tension, etc. For example, the relationships between one or more electrical characteristics of the maingate and tailgate motors are stored in memory (e.g., the memory 240). The relationships can be stored as one or more functions, one or more look up tables ("LUTs"), or as a series of thresholds to which the motor power or another characteristic of the AFC can be compared.

In some implementations, an electrical characteristic value is used to control the position of the hydraulic cylinder and thus the tension of the chain 315 (e.g., the tailgate top tension). The position of hydraulic cylinder is related (e.g., proportional) to the difference between the electrical characteristic value and a corresponding no-load electrical characteristic value. The difference between the measured electrical characteristic value and the no-load electrical characteristic value can then be used to determine a torque associated with one or more of the first sprocket 305 and second sprocket 310. The sprocket torque is used in conjunction with a known stiffness of the chain 315 and a characteristic stretching of the chain 315 to determine a distance that the hydraulic cylinder is to be extended. The position of the hydraulic cylinder (e.g., the extension of the hydraulic cylinder) is then modified to account for the stretch in the chain 315. As previously described, modifying the position of the hydraulic cylinder modifies the relative positions of the first sprocket 305 and the second sprocket 310.

In constructions that include a chain tension sensor, a chain tension signal generated by the chain tension sensor can be used to control the position of the hydraulic cylinder. The chain tension sensor is configured to directly measure the tension of one or more chains. An example of a system including a chain tension sensor is described and illustrated in Appendix A. The chain tension signal is, for example, a low-voltage signal that is indicative of the amount of tension associated with one or more chains. The controller 200 receives the chain tension signal. A signal conditioner or signal conditioning module within the controller 200 is configured to analyze and/or condition the low-voltage chain tension signal by identifying and sampling one or more signal peaks, averaging the sampled signal peaks, and generating a conditioned signal indicative of the dynamic tension of the one or more chains (e.g., in units of tons-per-chain). The controller is also configured to display the dynamic tension to a user, display diagnostics of the chain tension sensor to the user, calibrate the chain tension sensor, etc. The sensed chain tension (e.g., the conditioned signal indicative of the dynamic tension of one or more chains) can then be used in conjunction with a known stiffness of the chain 315 and a characteristic stretching of the chain 315 to determine a distance that the hydraulic cylinder is to be extended. The position of the hydraulic cylinder (e.g., the extension of the hydraulic cylinder) is then modified to account for the stretch in the chain 315. As previously described, modifying the position of the hydraulic cylinder modifies the relative positions of the first sprocket 305 and the second sprocket 310.

With respect to implementations of the invention in which a LUT is used, values for cylinder position, sprocket position, chain stretch, etc., are stored in memory corresponding to a plurality of electrical characteristic values or sensed chain tension values. In some implementations, 8-bit numbers (i.e., 256 values) or 16-bit numbers (i.e., 65,536 values) are used to identify a sprocket position, a chain tension, or a cylinder position that corresponds to the electrical characteristic value or the sensed chain tension value. The electrical characteristic value or chain tension value is used as an input value that is compared to the values stored in the LUT. The LUT entry that corresponds to the input value is then retrieved by the controller 200, and the position of the hydraulic cylinder, the sprocket position, etc. is adjusted accordingly. With respect to embodiments of the invention that use one or more functions (e.g., stored in memory 240), the electrical characteristic value or chain tension value is used as an input value to the one or more functions such that the controller 200 is able to calculate a corresponding hydraulic cylinder position, sprocket position, etc. Such a calculation technique may allow for finer control of the hydraulic cylinder position than using a LUT. With respect to implementations of the invention that use a variety of threshold values, the electrical characteristic value or chain tension value is compared sequentially to a series of threshold values. The threshold values correspond to the hydraulic cylinder position, the chain tension, the sprocket position, etc. In some implementations of the invention, the comparisons to threshold values are used when coarse hydraulic position control, chain tension control, sprocket position control, etc., is acceptable.

Figure 8:
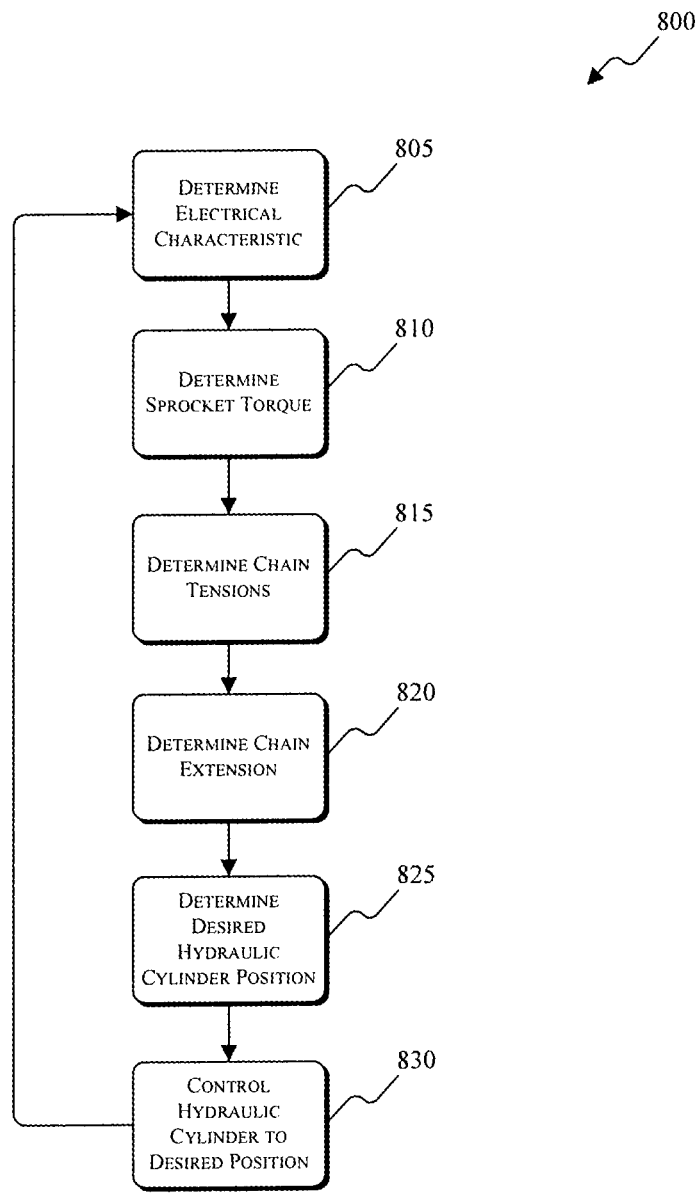
FIG. 8 is a process for controlling a position of a hydraulic cylinder.

FIG. 8 is a process 800 for controlling the AFC. At step 805, a value for an electrical characteristic is determined (e.g., measured, sensed, calculated, etc.). As described above, the electrical characteristic is, for example, a voltage, a current, a power factor, motor speed, motor torque, input power, output power, etc. Using the electrical characteristic value, the controller 200 is configured to determine a sprocket torque (step 810). As an illustrative example, the sprocket torque can be determined based on a power value of a motor and a rotational speed of a sprocket. Using these values, the torque can be calculated. A chain tension can then be calculated based on the sprocket torque (step 815). As previously described, the tension of the chain is related to an amount of stretch in the chain. Using the stored relationship (e.g., in memory 240) between chain tension and chain stretch, the amount of extension of the chain can be determined (step 820). The amount of chain extension is then associated (e.g., directly or indirectly) with a desired position of the hydraulic cylinder or a desired change in position of the hydraulic cylinder (step 825). Based on the desired position or change in position of the hydraulic cylinder, the controller 200 generates one or more control signals to control the hydraulic cylinder to the new position (step 830). Although the process 800 is described above with respect to controlling the position of a hydraulic cylinder, the process 800 an similarly be executed with respect to different characteristics of the AFC or a Longwall mining system, such as sprocket position, chain tension, shearer position, the amount of coal loaded on the AFC, the position of the extendable portion of the frame 100, etc.

Figure 9:
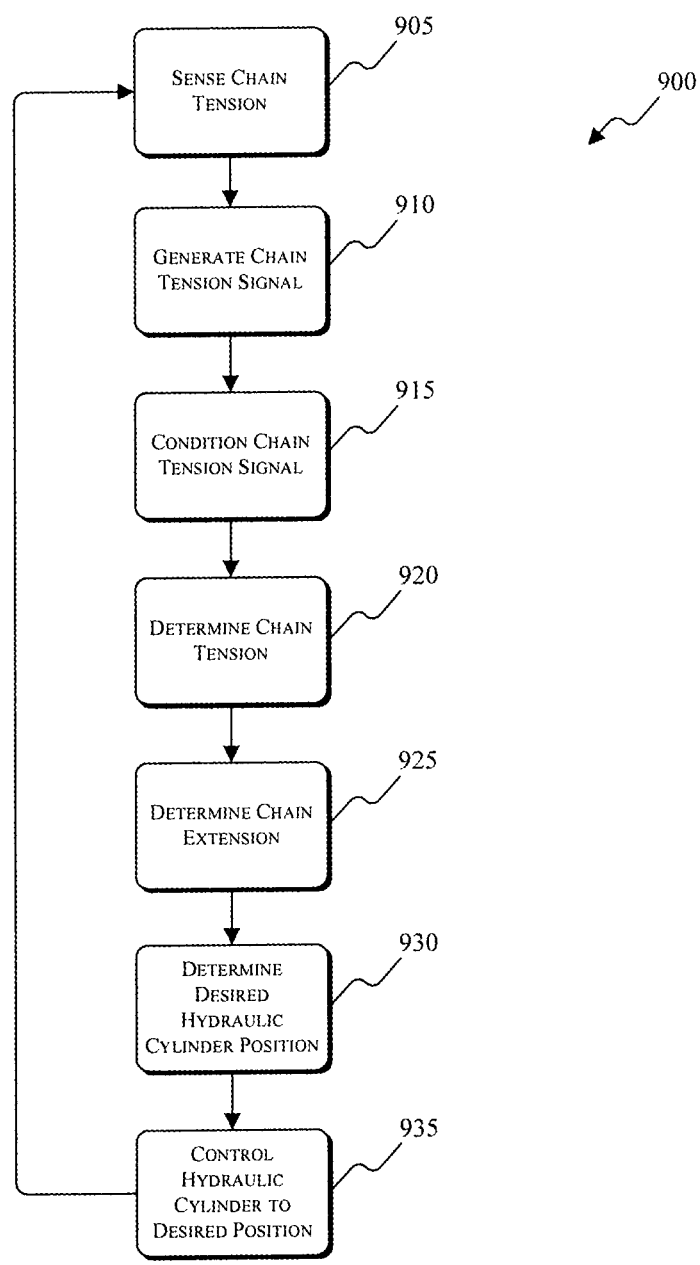
FIG. 9 is another process for controlling a position of a hydraulic cylinder.

FIG. 9 illustrates a process 900 for controlling the AFC. At step 905, chain tension is sensed using the chain tension sensor. The chain tension sensor generates a signal (step 910) that is indicative of the sensed chain tension. The chain tension signal is received by the controller 200 where a signal conditioning module conditions the chain tension signal (step 915) (e.g., samples, averages, etc.). The conditioned chain tension signal is then used to identify or determine the sensed tension in one or more chains (step 920). For example, the conditioned chain tension signal may correspond to an averaged voltage value from the chain tension sensor. A relationship between the averaged voltage and chain tension is then used to determine the actual corresponding chain tension. As previously described, the tension of the chain is related to an amount of stretch in the chain. Using the stored relationship (e.g., in memory 240) between chain tension and chain stretch, the amount of extension of the chain can be determined (step 925). The amount of chain extension is then associated (e.g., directly or indirectly) with a desired position of the hydraulic cylinder or a desired change in position of the hydraulic cylinder (step 930). Based on the desired position or change in position of the hydraulic cylinder, the controller 200 generates one or more control signals to control the hydraulic cylinder to the new position (step 935). Although the process 900 is described above with respect to controlling the position of a hydraulic cylinder, the process 900 can similarly be executed with respect to different characteristics of the AFC or a Longwall mining system, such as sprocket position, chain tension, shearer position, the amount of coal loaded on the AFC, the position of the extendable portion of the frame 100, etc.

Figure 10:
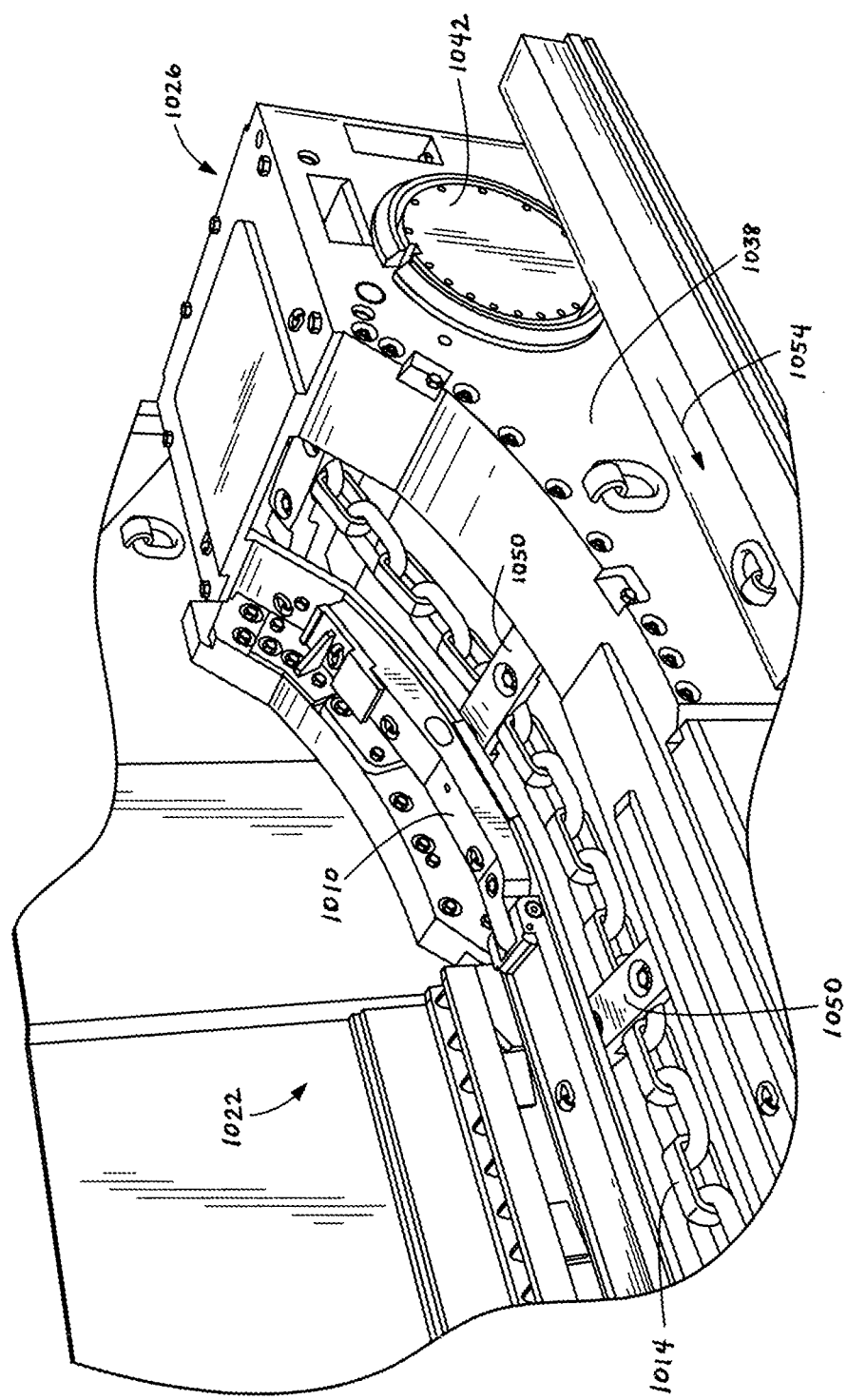
FIG. 10 is a perspective view of an end frame of a chain conveyor.
Figure 11:
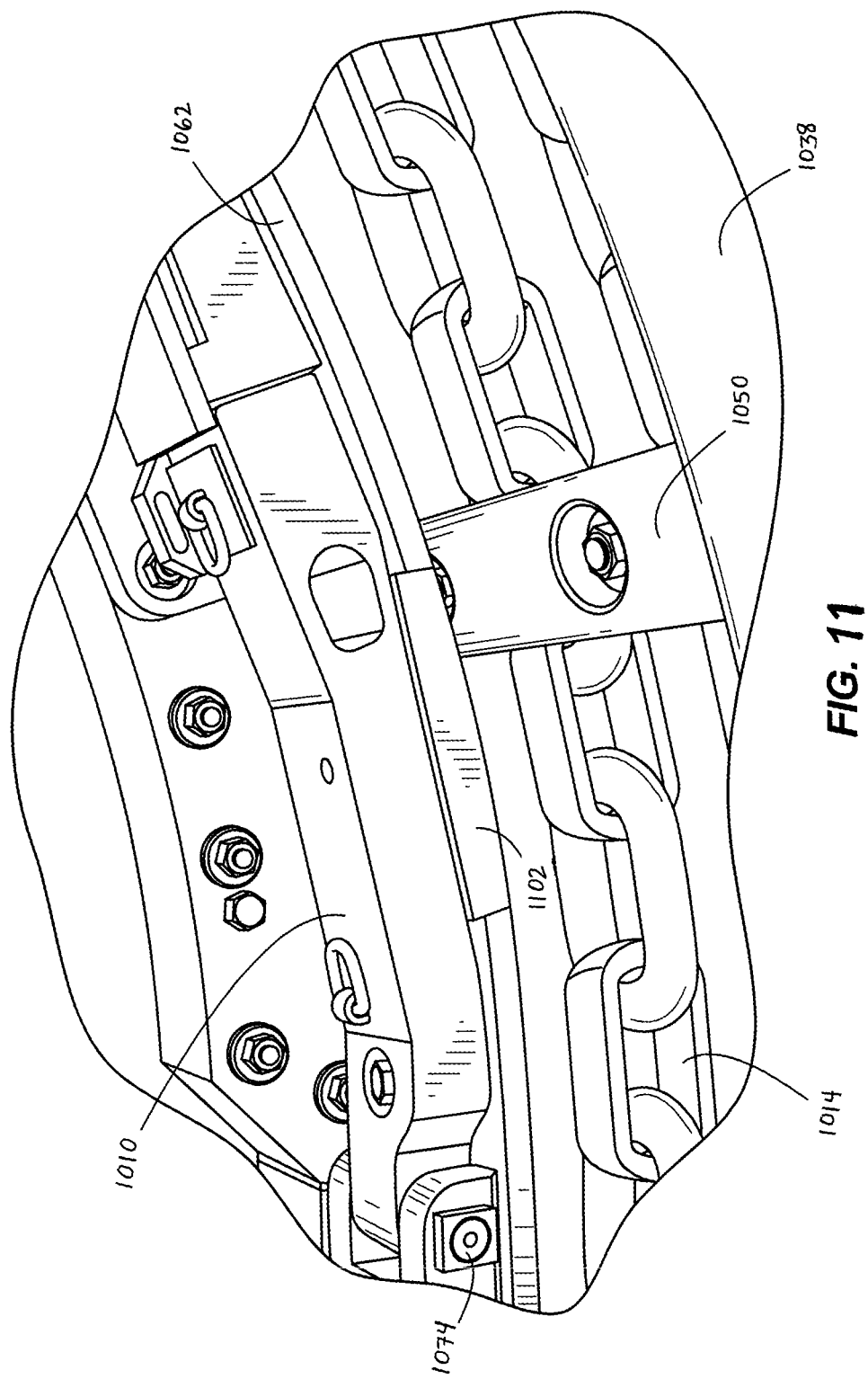
FIG. 11 is an enlarged view of the end frame of the chain conveyor of FIG. 10.
Figure 12:
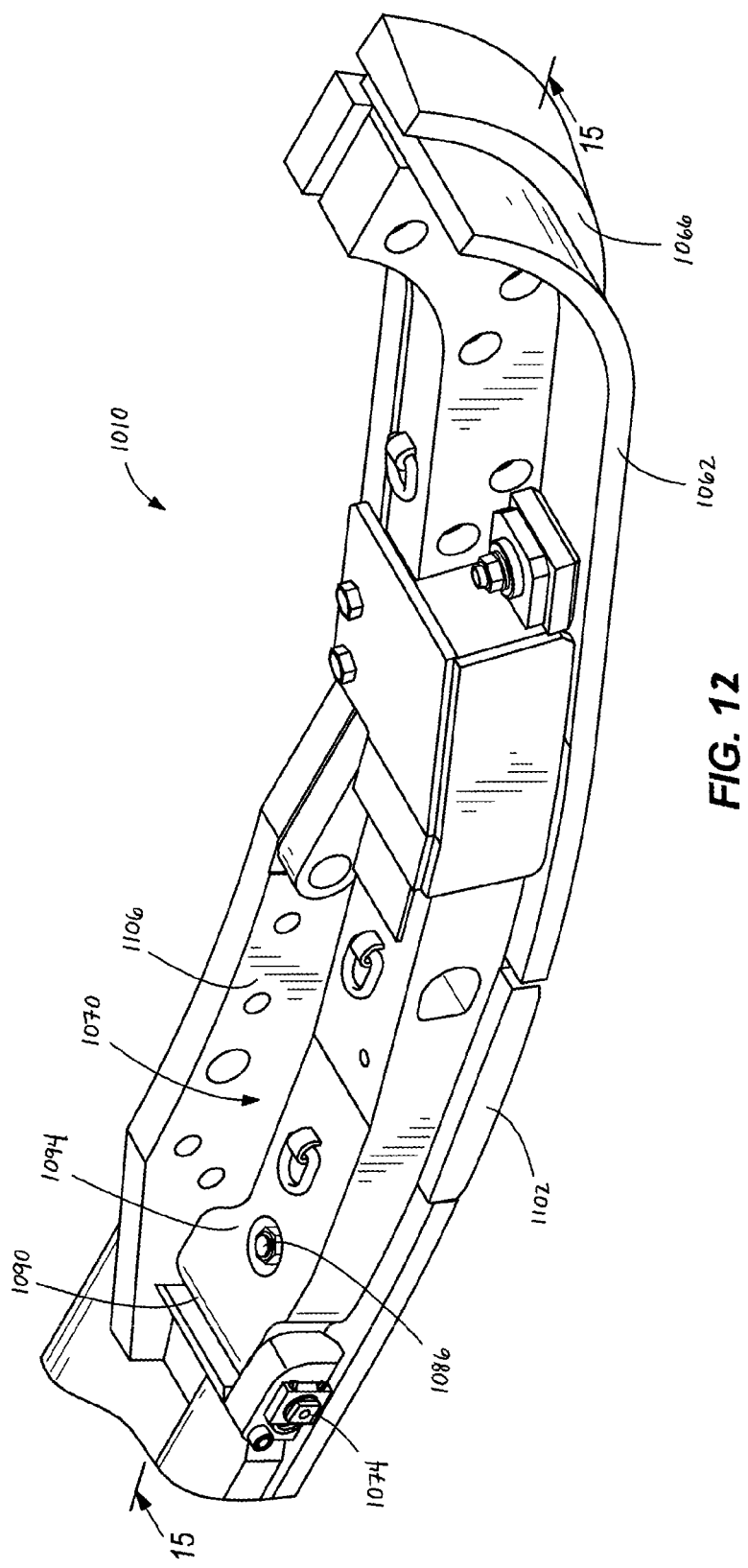
FIG. 12 is a perspective view of a sensor assembly.

FIGS. 10-11 illustrate a portion of a longwall conveyor 1022 including a return end 1026 (FIG. 11), a conveying element or chain 1014 that travels between the return end 1026 and a delivery end (not shown), and the sensor assembly 1010 proximate the return end 1026. The return end 1026 includes a frame 1038, an idler or take-up shaft 1042 mounted on the frame 1038, and at least one hydraulic actuator (not shown). The frame 1038 moves with respect to the delivery end, between an inner retracted position and an outer extended position through the extension and retraction of the hydraulic actuator. The chain 1014 passes around the take-up shaft 1042 to travel in a continuous loop between the delivery end and the return end 1026. The chain 1014 includes a plurality of flight members 1050 mounted on the chain 1014 and spaced apart by a first distance in a direction of travel 1054 of the chain 1014.

As shown in FIGS. 12-15, the sensor assembly 1010 is positioned adjacent a wear strip 1062 of a flange portion 1066 of the frame 1038 and includes a reaction arm 1070, a main support hinge pin 1074, a reaction bracket 1078 (FIGS. 13-14), a load sensing pin 1082 (FIGS. 13 and 15), and a spring assembly 1086. Examples of sensor assemblies can also be found in U.S. patent application Ser. No. 13/297,067, entitled "CHAIN TENSION SENSOR" and filed on Nov. 15, 2011, and U.S. patent application Ser. No. 13/553,487 (Attorney Docket No. 051077-9175-US02), entitled "CHAIN TENSION SENSOR" and filed on Jul. 19, 2012, the entire contents of both of which are hereby incorporated by reference.

Another example of a sensor assembly is disclosed in U.S. Pat. No. 8,061,510, entitled "DUAL SENSOR CHAIN BREAK DETECTOR," which issued on Nov. 22, 2011, and the entire content of which is hereby incorporated by reference.

The reaction arm 1070 has a first end 1090, a shoulder 1094, a second end 1098 (FIG. 13), and a load pad 1102. The first end 1090 is rotatably coupled to a secondary support plate 1106 of the frame 1038 by the main support hinge pin 1074. The shoulder 1094 is positioned proximate the first end 1090. The second end 1098 includes a hole 1122 (FIGS. 13 and 14) extending from the second end 1098 partially through the reaction arm 1070 in a longitudinal direction. The load pad 1102 is positioned intermediate the first end 1090 and the second end 1098. As shown in FIG. 11, the load pad 1102 is positioned parallel to the wear strip 1062 to contact the flight members 1050 passing the wear strip 1062, causing the reaction arm 1070 to rotate about the hinge pin 1074. The load pad 1102 also provides a continuous guide surface to guide the flight members 1050 as the flight members 1050 travel around the take-up shaft 1042.

The hinge pin 1074 is mounted to the secondary support plate 1106 of the frame 1038 and is positioned substantially transverse to the direction of travel 1054 of the chain 1014. The hinge pin 1074 restricts the motion of the reaction arm 1070 in every direction except rotation (see arrow 1130) about the hinge pin 1074.

Figure 13:
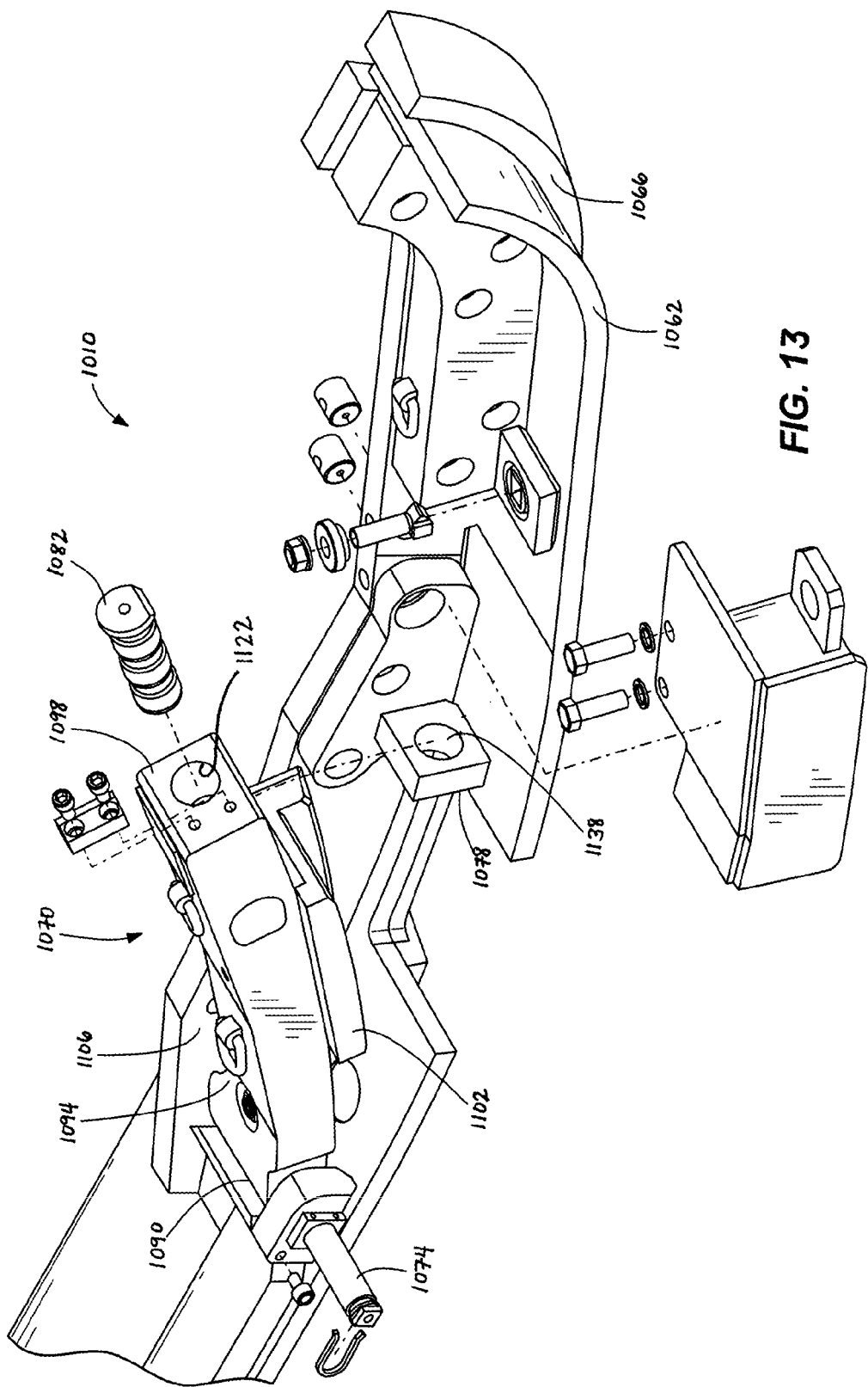
FIG. 13 is an assembly view of the sensor assembly shown in FIG. 12.
Figure 14:
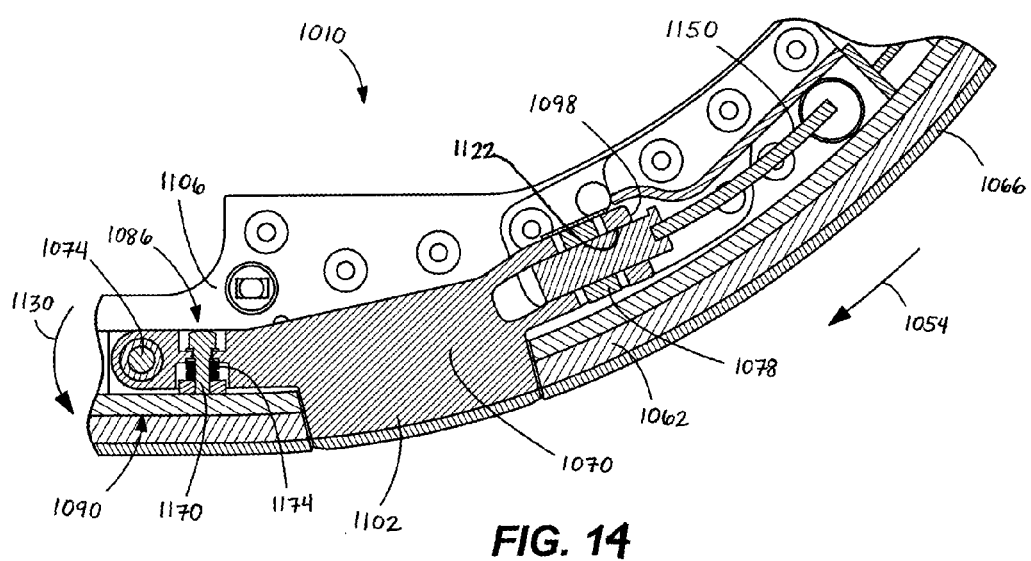
FIG. 14 is cross-sectional view of the sensor assembly shown in FIG. 12 taken along line 15-15.
Figure 15:
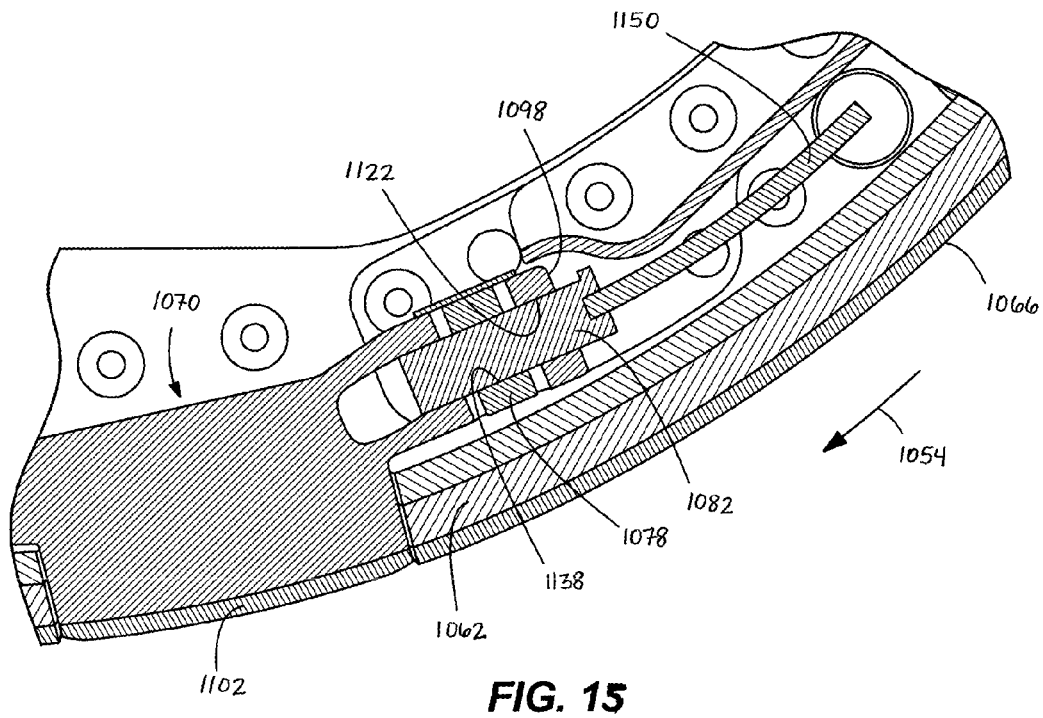
FIG. 15 is an enlarged cross-sectional view of the sensor assembly shown in FIG. 14.

As shown in FIGS. 13-15, the reaction bracket 1078 is mounted to the secondary support plate 1106 of the frame 1038 and includes a slot 1138. The reaction bracket 1078 is configured to fit within the second end 1098 of the reaction arm 1070 such that the slot 1138 is aligned with the hole 1122 extending through the reaction arm 1070. The load sensing pin 1082 is positioned in the slot 1138 of the reaction bracket 1078 and within the hole 1122 of the reaction arm 1070. The load sensing pin 1082 is therefore positioned substantially perpendicular to the hinge pin 1074. The load sensing pin 1082 is attached to a sensing cable 1150 (FIGS. 14 and 15).

Figure 16:
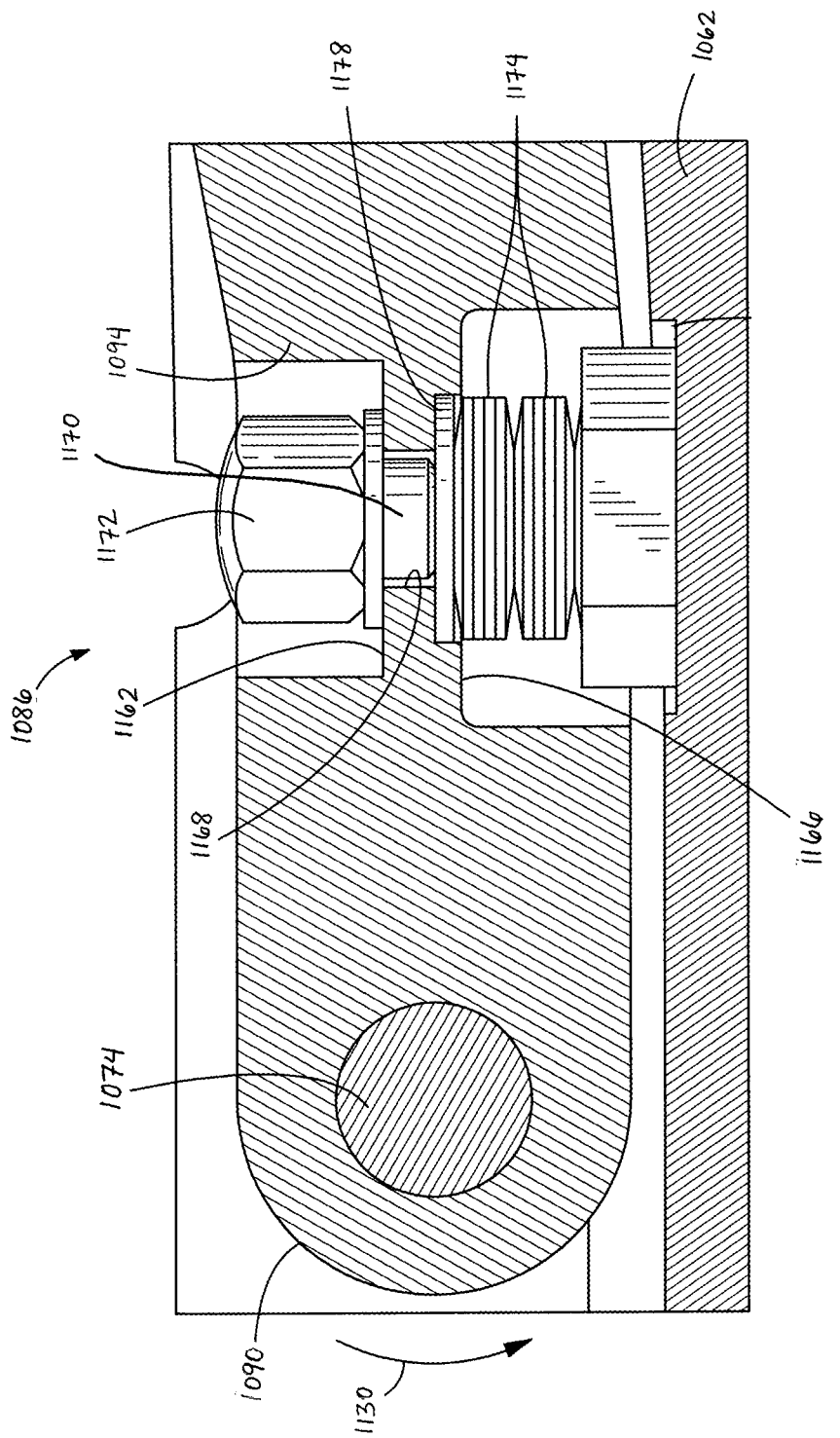
FIG. 16 is an enlarged cross-sectional view of the sensor assembly shown in FIG. 14.
Figure 17:
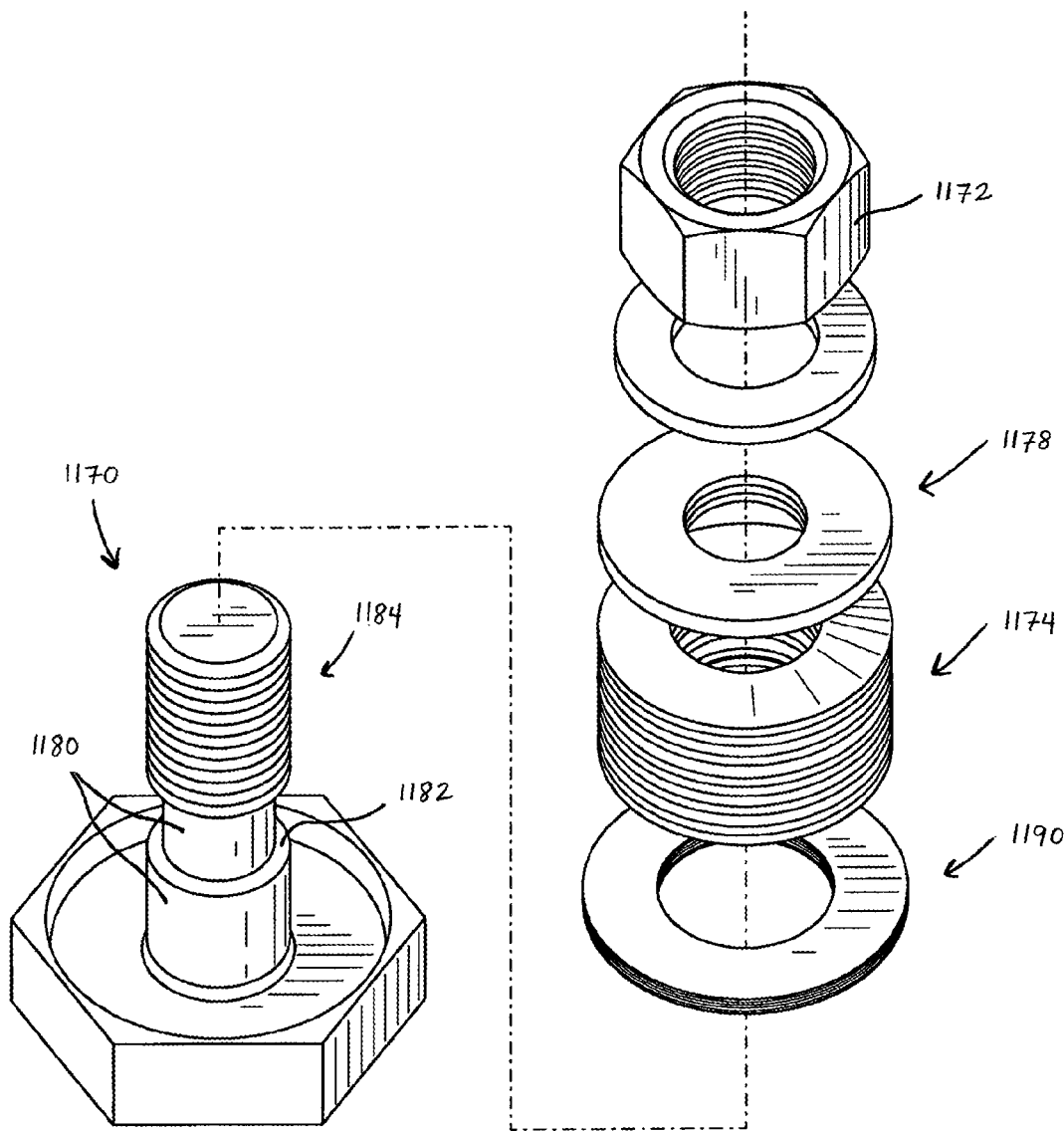
FIG. 17 is an exploded view of a spring assembly.

As shown in FIG. 16, the shoulder 1094 includes a head side 1162, a spring side 1166, and a bore 1168 extending between the head side 1162 and the spring side 1166 through the reaction arm 1070 in a direction tangential to a direction of rotation 1130 of the reaction arm 1070 (i.e., perpendicular to the hinge pin 1074). Referring to FIGS. 16 and 17, the spring assembly 1086 includes a pin or bolt 1170, a nut 1172, a plurality of spring washers 1174, and a retaining washer 1178. The bolt 1170 is coupled to the wear strip 1062 and passes through the shoulder bore 1168. The bolt 1170 includes a smooth portion 1180, a shoulder 1182, and a threaded portion 1184 for threadingly engaging the nut 1172, which is tightened to secure the shoulder 1094 with respect to the bolt 1170.

The spring washers 1174 are positioned around the bolt 1170 adjacent the spring side 1166, between the shoulder 1094 and the wear strip 1062. In the embodiment shown in FIG. 18, the bolt 1170 includes a cavity recess 1186 to reduce the material contact between the wear strip 1062 and the bolt 1170, thereby reducing the amount of heat transfer from the wear strip 1062 to the bolt 1170. The retaining washer 1178 is positioned between the spring side 1166 of the shoulder 1094 and the spring washers 1174. The retaining washer 1178 is screwed onto the bolt 1170 past the threaded portion 1184 of the bolt 1170, effectively "capturing" the spring washers 1174 around the smooth portion 1180. Each spring washer 1174 has a generally frusto-conical shape that creates a spring force as the spring washer 1174 is compressed. The compression of the spring washers 1174 therefore applies a pre-loaded force to the reaction arm 1070, biasing the reaction arm 1070 away from the frame 1038. The retaining washer 1178 centers the top-most spring washers 1174 with respect to the bolt 1170.

Figure 18:
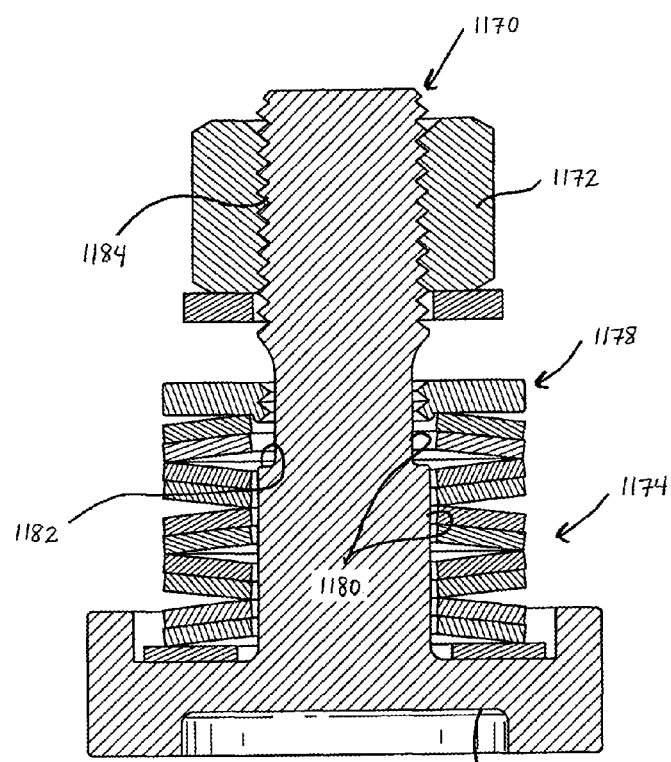
FIG. 18 is a cross-sectional view of the sensor assembly shown in FIG. 17.
Figure 19:
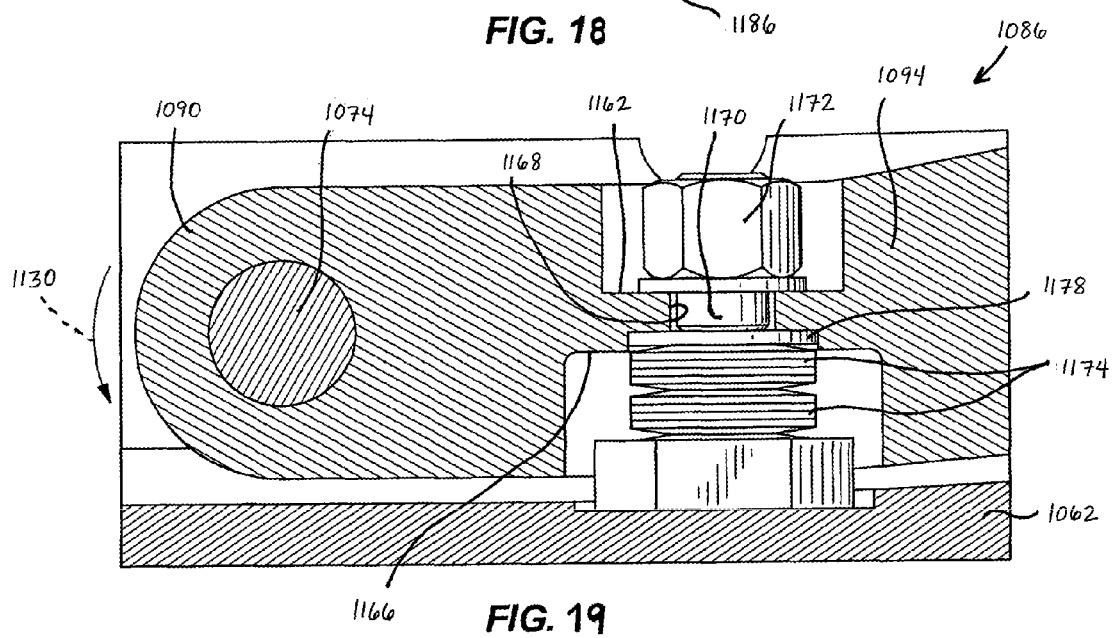
FIG. 19 is an enlarged cross-sectional view of a sensor assembly.

In the embodiment shown in FIG. 16, the nut 1172 is capped in order to prevent the nut 1172 from being tightened against the shoulder 1094. This maintains a clearance between the nut 1172 and the reaction arm 1070, allowing the pre-load force of the spring washers 1174 to be applied on the load pin 1082. In another embodiment (see FIGS. 17-19), the nut 1172 is open allowing the nut 1172 to be tightened against the shoulder 1094 (FIG. 19). As the nut 1172 is tightened, the retaining washer 1178 compresses each spring washer 1174, and the reaction arm shoulder 1094 is secured against the retaining washer 1178. Tightening the nut 1172 causes the retaining washer 1178 to draw closer to the bolt shoulder 1182 (FIG. 18). Once the retaining washer 1178 contacts the bolt shoulder 1182, the nut 1172 cannot be tightened any further. In this way, the bolt shoulder 1182 provides mechanical lock-out, preventing over-compression of the spring washers 1174.

The spring washers 1174 may be stacked in a number of configurations in order to obtain the desired pre-load force on the reaction arm 1070. For instance, the spring washers 1174 may be stacked in alternating sets such that the "peaks" of two washers 1174 are against each other, and the "peaks" of the adjacent washers 1174 are inverted with respect to the first two (see FIG. 18). The desired configuration can be accomplished using fewer or more washers 1174 in each set. Alternatively, all of the washers 1174 can be aligned in one direction. In another alternative, a single spring washer 1174 may be used. In still other constructions, a different type or shape of spring may be used.

A plurality of shims 1190 (see FIG. 19) may be added to the area between the retaining washer 1178 and the cavity recess 1186 in order to account for the build-up of tolerances in the bolted joint and/or to apply additional compressive force on the spring washer(s) 1174.

During operation, the load pad 1102 of the reaction arm 1070 contacts the flight members 1050 of the chain 1014 as the flight members 1050 pass between the return end 1026 and the delivery end. In this manner, the load pad 1102 is subjected to the vertical component of the chain tension. Contact with the flight members 1050 causes the reaction arm 1070 to rotate about the hinge pin 1074.

Referring to FIG. 14, as the reaction arm 1070 rotates in the direction of rotation 1130, the second end 1098 deflects upwardly, exerting an upward force on the load sensing pin 1082. The reaction bracket 1078 resists this deflection, exerting a downward force on the load sensing pin 1082, thereby creating a shear load condition on the pin 1082. The load sensing pin 1082 senses the magnitude of the shear force and/or the strain and transmits a signal indicative of the force or strain through the sensing cable 1150 to a chain controller (not shown). The chain controller then uses this information to determine the tension in the chain 1014 and to calculate the necessary change in position of the return end frame 1026 in order to maintain the desired tension in the chain 1014.

The biasing force of the spring assembly 1086 provides a pre-load force that can be calibrated. Instead of calibrating the tension to the maximum load the chain 1014 may experience during operation (e.g., in one embodiment, approximately five tons; in other embodiments, this maximum load may be greater than or less than this value), the positive pre-load permits the chain tension to be set to a lesser load. This may reduce inter-link chain wear and sprocket wear and, ultimately, increase the life of the chain 1014. In addition, the tolerance "stack-up" of the spring washers 1174 provides a wide range of configurations and pre-load characteristics for the reaction arm 1070. In one example, a pre-load in the range of 200 to 400 lbs. may provide improved results for even very high material loads.

In one embodiment, the pre-load acts on the reaction arm 1070 in a "positive" direction (i.e., substantially parallel to the direction of the force exerted on the reaction arm 1070 by the flight members 1050). The positive base load may facilitate accurate measurement in strain gauge sensors, enhancing accuracy of the system. In addition, the positive pre-load may also reduce the occurrence of negative outputs, which can falsely trigger system alerts.

Due to the perpendicular orientation of the load sensing pin 1082 with respect to the hinge pin 1074, the load sensing pin 1082 only senses the vertical component (e.g., the rotation of the reaction arm 1070 about the hinge pin 1074) of the force exerted on the reaction arm 1070. This effectively isolates the load sensing pin 1082 from impacts to the load pad 1102 of the reaction arm 1070, resulting in improved reliability and a more accurate electrical signal.

Also, in one embodiment, the load pad 1102 has a length that is a significant proportion of the distance between the flight members 1050. In one embodiment, the load pad 1102 has a length in a range between approximately 60% and approximately 70% of the distance between the flight members 1050. This significant length provides a smaller gap between the moment when one flight member 1050 contacts the load pad 1102 and the moment when a second flight member 1050 contacts the load pad 1102, reducing the oscillation of the load pad 1102 (and therefore the load sensing pin 1082) between a loaded position and an unloaded position. This aids the load sensing pin 1082 in generating a smooth, level signal.

Spurious loading arising from the impact of the flight members 1050 with the load pad 1102 is absorbed by the main support hinge pin 1074, which is positioned at a right angle to both the direction of travel 1054 of the chain 1014 and the flight members 1050. In addition, the load sensing pin 1082 is not directly in contact with the wear strip 1062, reducing the impact loading and insulating the load sensing pin 1082 from heat caused by the friction contact of the flight members 1050 sliding against the underside of the wear strip 1062.

In an alternative independent embodiment, the conveyor 1022 may include a plurality of load sensor assemblies 1010. For example, the conveyor 1022 may include a sensor assembly 1010 mounted on each side of the chain 1014, with each sensor 1010 measuring the tension in the associated chain 1014 independently and permitting the operator to detect breakage in either chain 1014. Because the chains 1014 are connected to one another by the flight members 1050, some amount of the tension load in the chains 1014 will be shared in the event that a chain 1014 breaks.

While the described location of the sensor assembly 1010 is beneficial because the sensor assembly 1010 is subjected to less direct impact loads, in an alternative embodiment, the sensor assemblies 1010 may be spaced along the length of and on either side of the conveyor 1022.

Thus, the invention may generally provide, among other things, systems and methods for controlling the operation of a mining system based on an electrical characteristic and/or a tension sensor.

What is claimed is:

1. A conveyor for a mining system, the conveyor comprising:
    a frame having a fixed first end and an extendable second end;
    a first sprocket having a first position;
    a second sprocket having a second position, the first position being separated by a distance from the second position;
    a chain associated with the first sprocket and the second sprocket;
    a first sensor configured to generate a first signal indicative of a chain tension;
    a second sensor configured to sense an electrical characteristic of the conveyor and to generate a second signal indicative of the chain tension based on the electrical characteristic of the conveyor;
    a hydraulic cylinder coupled to the extendable second end of the frame, a position of the hydraulic cylinder determining the distance between the first position and the second position; and
    a controller configured to
        receive the first signal from the first sensor,
        receive the second signal from the second sensor,
        compare the first signal and the second signal,
        determine the chain tension based on one of the first signal and the second signal, and
        control the position of the hydraulic cylinder based on the determined chain tension.

2. The system of claim 1, wherein the controller is further configured to determine whether one of the first sensor and the second sensor is in a fault condition.

3. The system of claim 2, wherein the one of the first signal and the second signal is used to determine the chain tension when the other of the first signal and the second signal received is determined to be in the fault condition.

4. The system of claim 1, wherein the controller is further configured to
    determine whether one of the first signal and the second signal is not received by the controller; and
    determine the chain tension based on the other of the first signal and the second signal.

5. The system of claim 4, wherein one of the first sensor and the second sensor is a primary sensor, and wherein the primary sensor fails to provide the one of the first signal and the second signal.

6. The system of claim 1, wherein the second signal is related to at least one of a voltage, a current, a power factor, a motor speed, a motor torque, an input power, or an output power.

7. The system of claim 1, wherein the first sensor is a chain tension load sensor.

8. The system of claim 7, wherein the chain tension load sensor includes a load sensing pin.

9. A method of controlling a chain tension for a conveyor in a mining system, the method comprising:
    configuring a controller to receive a first signal from a first sensor, the first signal being indicative of the chain tension;
    configuring the controller to receive a second signal from a second sensor, the second sensor being configured to sense an electrical characteristic of the conveyor, and the second signal being indicative of the chain tension based on the electrical characteristic of the conveyor;
    comparing the first signal and the second signal;
    determining the chain tension based on one of the first signal and the second signal;
    determining a position for a hydraulic cylinder based on the determined chain tension; and
    controlling the hydraulic cylinder to the position.

10. The method of claim 9, further comprising:
    determining whether one of the first signal and the second signal is corrupt; and
    determining the chain tension based on the other of the first signal and the second signal when the one of the first signal and the second signal is determined to be corrupt.

11. The method of claim 10, wherein one of the first sensor and the second sensor is a primary sensor, and wherein the one of the first signal and the second signal provided by the primary sensor is determined to be corrupt.

12. The method of claim 9, wherein determining the chain tension based on the one of the first signal and the second signal includes determining an amount of chain stretch based on the one of the first signal and the second signal.

13. The method of claim 9, further comprising:
determining whether one of the first signal and the second signal is not received by the controller; and
determining the chain tension based on the other of the first signal and the second signal.

14. The method of claim 9, wherein the second signal is related to at least one of a voltage, a current, a power factor, a motor speed, a motor torque, an input power, or an output power.

15. The method of claim 9, wherein the first sensor is a chain tension load sensor including a load sensing pin.

16. A conveyor for a mining system, the conveyor comprising:
a frame having a fixed first end and an extendable second end;
a first sprocket having a first position;
a second sprocket having a second position, the first position being separated by a distance from the second position;
a chain associated with the first sprocket and the second sprocket;
a first sensor configured to generate a first signal indicative of a first characteristic of the conveyor;
a second sensor configured to generate a second signal indicative of a second characteristic of the conveyor, the second characteristic being different than the first characteristic;
a hydraulic cylinder coupled to the extendable second end of the frame, a position of the hydraulic cylinder determining the distance between the first position and the second position; and
a controller configured to
receive the first signal from the first sensor,
receive the second signal from the second sensor,
compare the first signal and the second signal,
determine whether one of the first signal and the second signal is corrupt or is not received,
determine a chain tension based on the other of the first signal and the second signal when the one of the first signal and the second signal is determined to be corrupt or is not received, and
control the position of the hydraulic cylinder based on the determined chain tension.

17. The system of claim 16, wherein the first characteristic is a mechanical characteristic, and the first signal is indicative of the chain tension; and wherein the second characteristic is an electrical characteristic, and the second signal is indicative of the chain tension based on the electrical characteristic.

18. The system of claim 17, wherein the second signal is related to at least one of a voltage, a current, a power factor, a motor speed, a motor torque, an input power, or an output power.

19. The system of claim 17, wherein the first sensor is a chain tension load sensor.

20. The system of claim 19, wherein the chain tension load sensor includes a load sensing pin.

* * * * *